United States Patent
Keogh et al.

(10) Patent No.: US 7,770,683 B2
(45) Date of Patent: Aug. 10, 2010

(54) THREE-WHEELED VEHICLE

(75) Inventors: Dominic Keogh, Germantown, WI (US); Andrew James Ravn, West Bend, WI (US); Mark W. Fischer, Caledonia, WI (US); Michael L. Welliver, Milwaukee, WI (US); Steven P. Pertzsch, Oconomowoc, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 135 days.

(21) Appl. No.: 12/174,050

(22) Filed: Jul. 16, 2008

(65) Prior Publication Data

US 2010/0012414 A1 Jan. 21, 2010

(51) Int. Cl.
*B62D 61/06* (2006.01)
*B62K 5/06* (2006.01)

(52) U.S. Cl. .................. 180/210; 180/89.1; 180/311; 280/783

(58) Field of Classification Search .............. 280/62, 280/781, 783, 785, 796, 797, 798; 403/339, 403/393, 380, 388; 180/89.1, 89.11, 311, 180/312; 296/35.1, 193.06, 37.1
See application file for complete search history.

(56) References Cited

U.S. PATENT DOCUMENTS

| | | | |
|---|---|---|---|
| 1,565,624 A | | 12/1925 | Chilton |
| 1,879,275 A | * | 9/1932 | Ison ............................ 180/16 |
| 1,933,102 A | * | 10/1933 | Du Pont et al. ............. 180/210 |
| 2,878,032 A | * | 3/1959 | Hawke ....................... 280/282 |
| 3,872,944 A | * | 3/1975 | Shapiro et al. .............. 180/208 |
| 3,945,463 A | | 3/1976 | Okano et al. |
| 4,139,072 A | | 2/1979 | Dawson |
| 4,449,602 A | * | 5/1984 | Dittmann, Jr. ............... 180/215 |
| 4,461,366 A | * | 7/1984 | Honda ........................ 180/229 |
| 4,485,884 A | | 12/1984 | Fukunaga et al. |
| 4,500,101 A | | 2/1985 | Aoki |
| 4,556,119 A | | 12/1985 | Shiratsuchi |
| 4,660,854 A | | 4/1987 | Suzuki et al. |
| 4,805,716 A | | 2/1989 | Tsunoda et al. |
| 5,025,883 A | | 6/1991 | Morinaka et al. |
| 5,248,012 A | | 9/1993 | Kurawaki et al. |
| 5,284,221 A | | 2/1994 | Warne |
| 5,377,776 A | | 1/1995 | Saiki |
| 5,487,443 A | | 1/1996 | Thurm |

(Continued)

FOREIGN PATENT DOCUMENTS

WO 2007052298 5/2007

*Primary Examiner*—Paul N Dickson
*Assistant Examiner*—Joseph Rocca
(74) *Attorney, Agent, or Firm*—Michael Best & Friedrich LLP (57) ABSTRACT

A three-wheeled vehicle includes a main frame assembly having a steering head disposed on a front portion of the main frame assembly, a front fork assembly pivotably coupled to the steering head, a front wheel rotatably supported by the front fork assembly, a rear frame coupled to a rear portion of the main frame assembly, a rear axle assembly coupled to at least one of the main frame assembly and the rear frame, a pair of rear wheels rotatably supported by the rear axle assembly, an engine-transmission assembly supported by the main frame assembly and positioned between the front wheel and the pair of rear wheels, and a body including a first mounting portion directly mounted to the main frame assembly, and a second mounting portion directly mounted to the rear frame.

19 Claims, 8 Drawing Sheets

U.S. PATENT DOCUMENTS

| | | | |
|---|---|---|---|
| 5,704,442 | A | 1/1998 | Okazaki et al. |
| D394,234 | S | 5/1998 | Gogan et al. |
| 5,845,728 | A | 12/1998 | Itoh et al. |
| 5,921,339 | A | 7/1999 | Matsuura |
| 5,931,360 | A | 8/1999 | Reichert |
| 5,984,336 | A | 11/1999 | Hanafusa et al. |
| 6,003,628 | A | 12/1999 | Jurrens et al. |
| 6,073,948 | A | 6/2000 | Motojima et al. |
| 6,257,362 | B1 | 7/2001 | Scherbarth |
| 6,290,015 | B1 | 9/2001 | Horii et al. |
| 6,290,017 | B1 | 9/2001 | Ito |
| 6,446,996 | B1 | 9/2002 | Horii |
| 6,575,259 | B2 | 6/2003 | Buell et al. |
| 6,682,096 | B2 * | 1/2004 | Kajikawa et al. ............ 280/797 |
| 6,846,018 | B2 | 1/2005 | Dennert et al. |
| 7,441,809 | B1 * | 10/2008 | Coombs et al. ............. 280/785 |
| 2003/0121711 | A1 * | 7/2003 | Chiu .......................... 180/312 |
| 2003/0164257 | A1 | 9/2003 | Soileau |
| 2004/0035623 | A1 | 2/2004 | Fecteau et al. |
| 2004/0178011 | A1 * | 9/2004 | Lenkman .................... 180/210 |
| 2006/0060407 | A1 | 3/2006 | Siddle |
| 2008/0283320 | A1 * | 11/2008 | Bowles et al. ............... 180/210 |

\* cited by examiner

FIG. 8

THREE-WHEELED VEHICLE

FIELD OF THE INVENTION

The present invention relates to vehicles, and more particularly to three-wheeled vehicles.

BACKGROUND OF THE INVENTION

Three-wheeled motorcycles or "trikes" are typically manufactured using a motorcycle frame as its foundation. Usually, a conventional or slightly modified motorcycle frame is used in combination with a rear frame, which is typically mounted to a rear portion of the conventional motorcycle frame. A trunk body, in turn, is usually mounted directly to the rear frame.

SUMMARY OF THE INVENTION

In manufacturing such three-wheeled motorcycles or trikes, tolerance stack-up from the conventional motorcycle frame, the rear frame, and the trunk body may sometimes lead to misalignment of the trunk body with the conventional motorcycle frame.

The present invention provides, in one aspect, a three-wheeled vehicle including a main frame assembly having a steering head disposed on a front portion of the main frame assembly, a front fork assembly pivotably coupled to the steering head, a front wheel rotatably supported by the front fork assembly, a rear frame coupled to a rear portion of the main frame assembly, a rear axle assembly coupled to at least one of the main frame assembly and the rear frame, a pair of rear wheels rotatably supported by the rear axle assembly, an engine-transmission assembly supported by the main frame assembly and positioned between the front wheel and the pair of rear wheels, and a body including a first mounting portion directly mounted to the main frame assembly, and a second mounting portion directly mounted to the rear frame.

The present invention provides, in another aspect, a method of manufacturing a three-wheeled vehicle. The method includes providing a main frame assembly having a first boss and a second boss extending from a rear portion thereof, coupling an engine-transmission assembly to the main frame assembly, securing a rear frame to the first boss of the main frame assembly, providing a trunk body including a first mounting portion and a second mounting portion, securing the first mounting portion directly to the second boss of the main frame assembly, and securing the second mounting portion directly to the rear frame.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
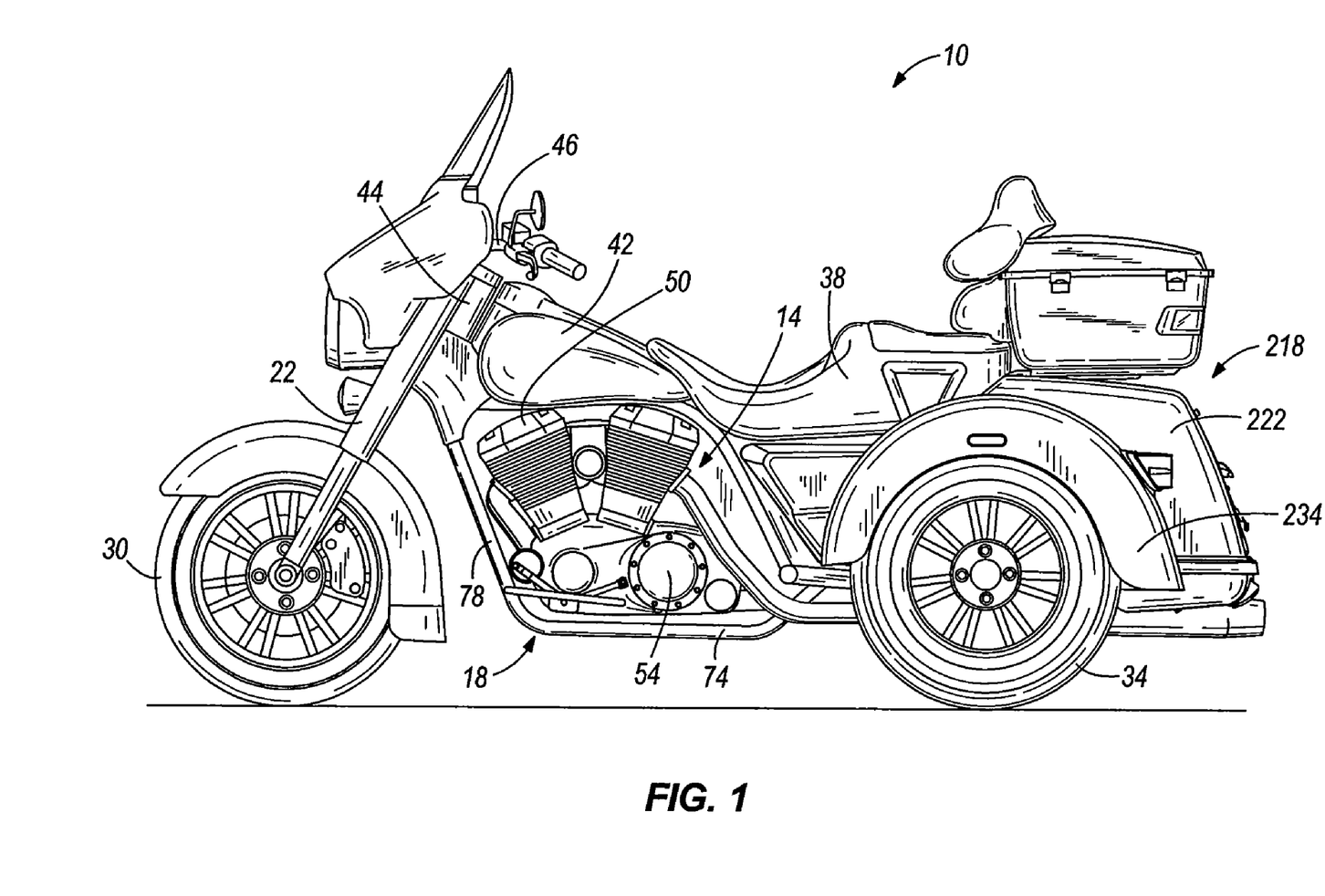
FIG. 1 is a side view of a three-wheeled vehicle embodying the present invention.

FIG. 1 illustrates a three-wheeled vehicle 10, commonly known to those skilled in the art as a "trike," including an engine-transmission assembly 14, a multi-piece frame 18, a front fork assembly 22, a rear axle assembly (not shown), a front wheel 30, a pair of rear wheels 34 (only one of which is shown in FIG. 1), a seat 38, and a fuel tank 42. The frame 18 supports the engine-transmission assembly 14, the front fork assembly 22, the seat 38, and the fuel tank 42. The frame 18 includes a steering head 44 that pivotally supports the front fork assembly 22, which, in turn, supports the front wheel 30. The front fork assembly 22 includes a pair of handlebars 46 for steering the vehicle 10. The rear axle assembly is coupled to the frame 18 at a rear end of the vehicle 10 and rotatably supports the rear wheels 34. The seat 38 is coupled to the frame 18 and is configured for supporting a rider. The fuel tank 42 is supported by the frame 18 and provides fuel to the engine-transmission assembly 14.

The engine-transmission assembly 14 is coupled to the frame 18 beneath the seat 38 between the front wheel 30 and the rear wheels 34 of the vehicle 10. With continued reference to FIG. 1, the engine-transmission assembly 14 includes an engine 50 and a transmission 54, which comprise distinct, independent components of the assembly 14. The engine 50 comprises a V-twin engine 50 supported by the frame 18 forward of the transmission 54. The engine 50 includes an output shaft (not shown), such as a crankshaft, which includes a primary drive sprocket (not shown) for driving a primary chain (not shown) in a conventional manner to power the transmission 54.

Figure 2:
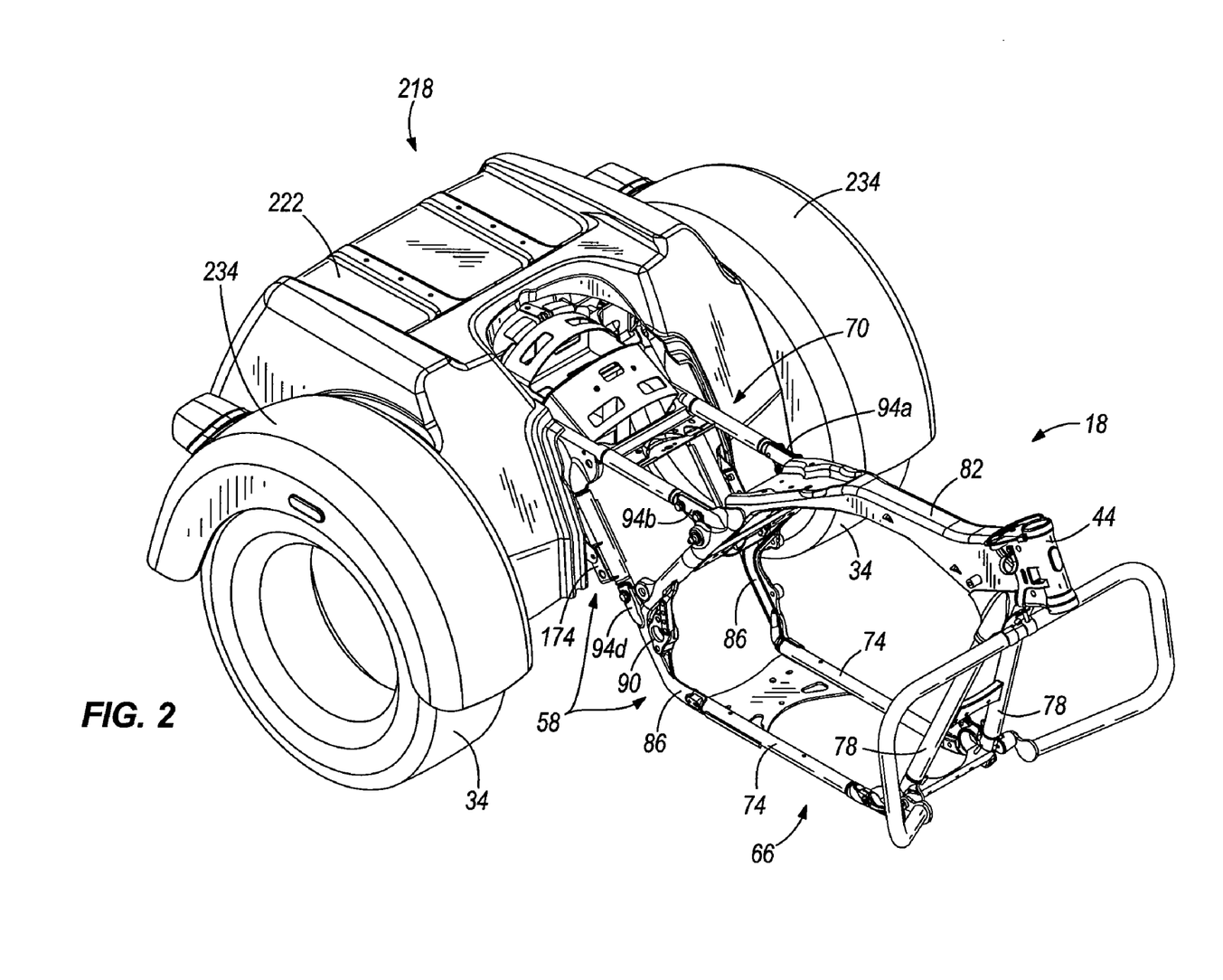
FIG. 2 is a front perspective view of the three-wheeled vehicle of FIG. 1, with portions removed.
Figure 3:
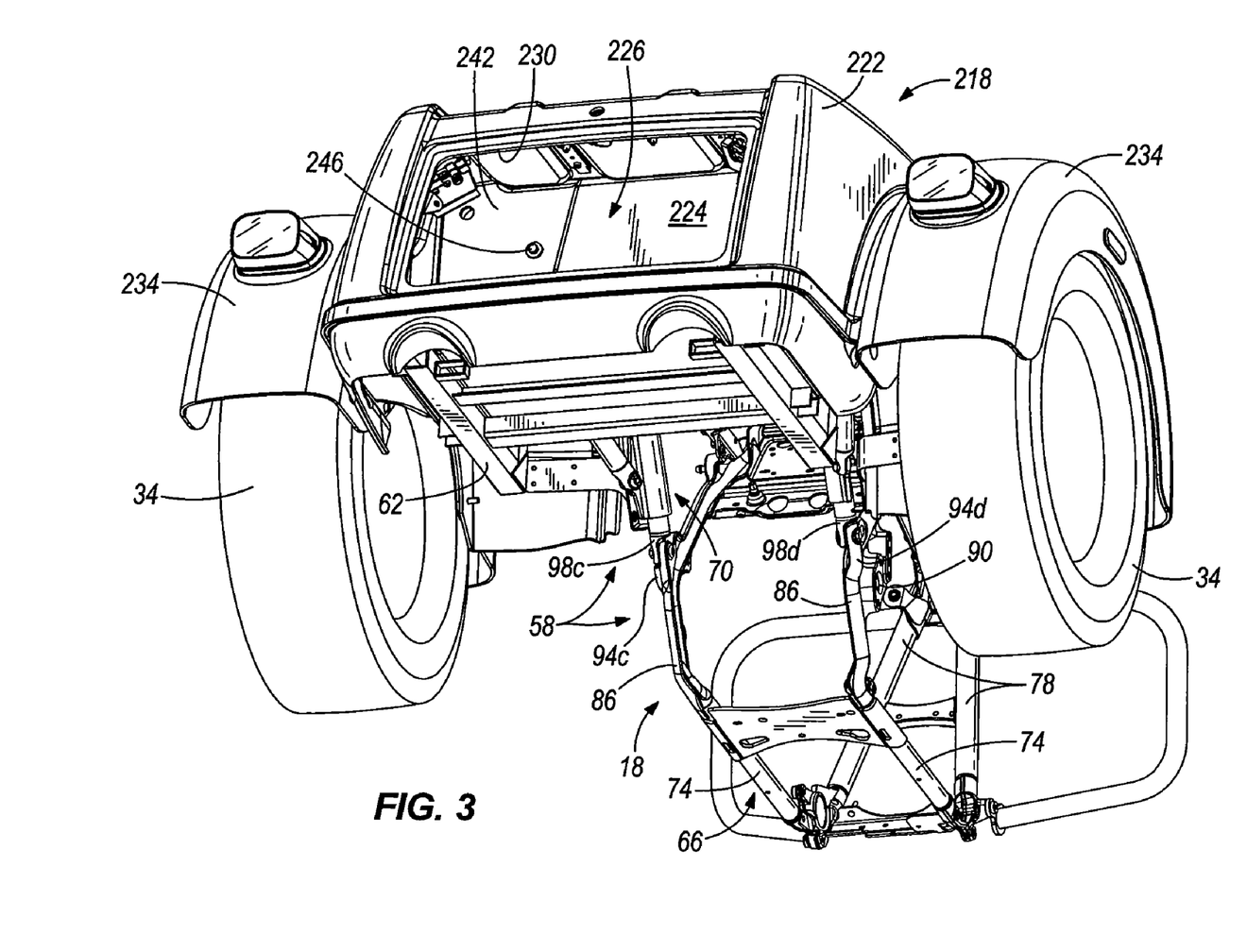
FIG. 3 is a bottom, rear perspective view of the three-wheeled vehicle of FIG. 2.
Figure 4:
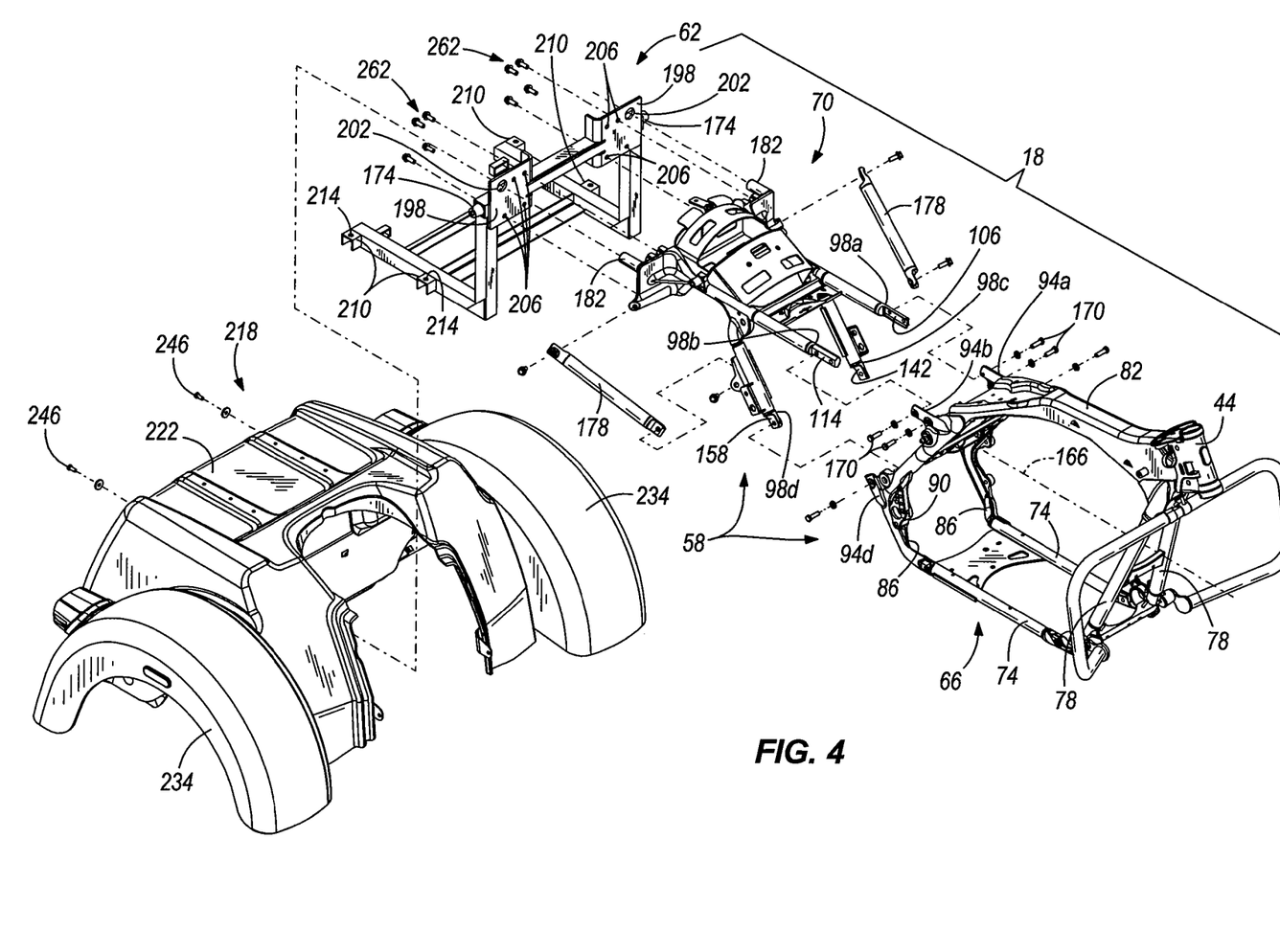
FIG. 4 is an exploded, front perspective view of the three-wheeled vehicle of FIG. 2, illustrating a main frame assembly, a rear frame, and a trunk body.

With reference to FIGS. 2-4, the multi-piece frame 18 includes a main frame assembly 58 and a rear frame 62 coupled to the main frame assembly 58. In the illustrated construction of the three-wheeled vehicle 10, the main frame assembly 58 includes a first or a main frame 66 and a second or a tail frame 70 fastened to the main frame 66 (see FIG. 4). Alternatively, the main frame assembly 58 may be configured as a unitary structure. With continued reference to FIG. 4, the main frame 66 includes the steering head 44, a pair of substantially longitudinal frame members 74 configured to support the engine-transmission assembly 14, a pair of downtubes 78 extending between the steering head 44 and the longitudinal frame members 74, and a frame backbone 82. The main frame 66 also includes a pair of rear frame members 86 extending between the longitudinal frame members 74 and the frame backbone 82. In the illustrated construction of the three-wheeled vehicle 10, the rear frame members 86 are forgings that are welded to the longitudinal frame members 74 and other portions of the frame 66 (e.g., the frame backbone 82). The rear frame members 86 also each include a pivot 90 configured to receive a pin or axle (not shown) for pivotably mounting the rear axle assembly. Alternatively, the rear frame members 86 may be made from any appropriate process such as a casting process, or the rear frame members 86 may comprise a rear portion of the main frame 66 that does not support the rear axle assembly. As a further alternative, the main frame 66 may have any of a number of different configurations.

Figure 5:
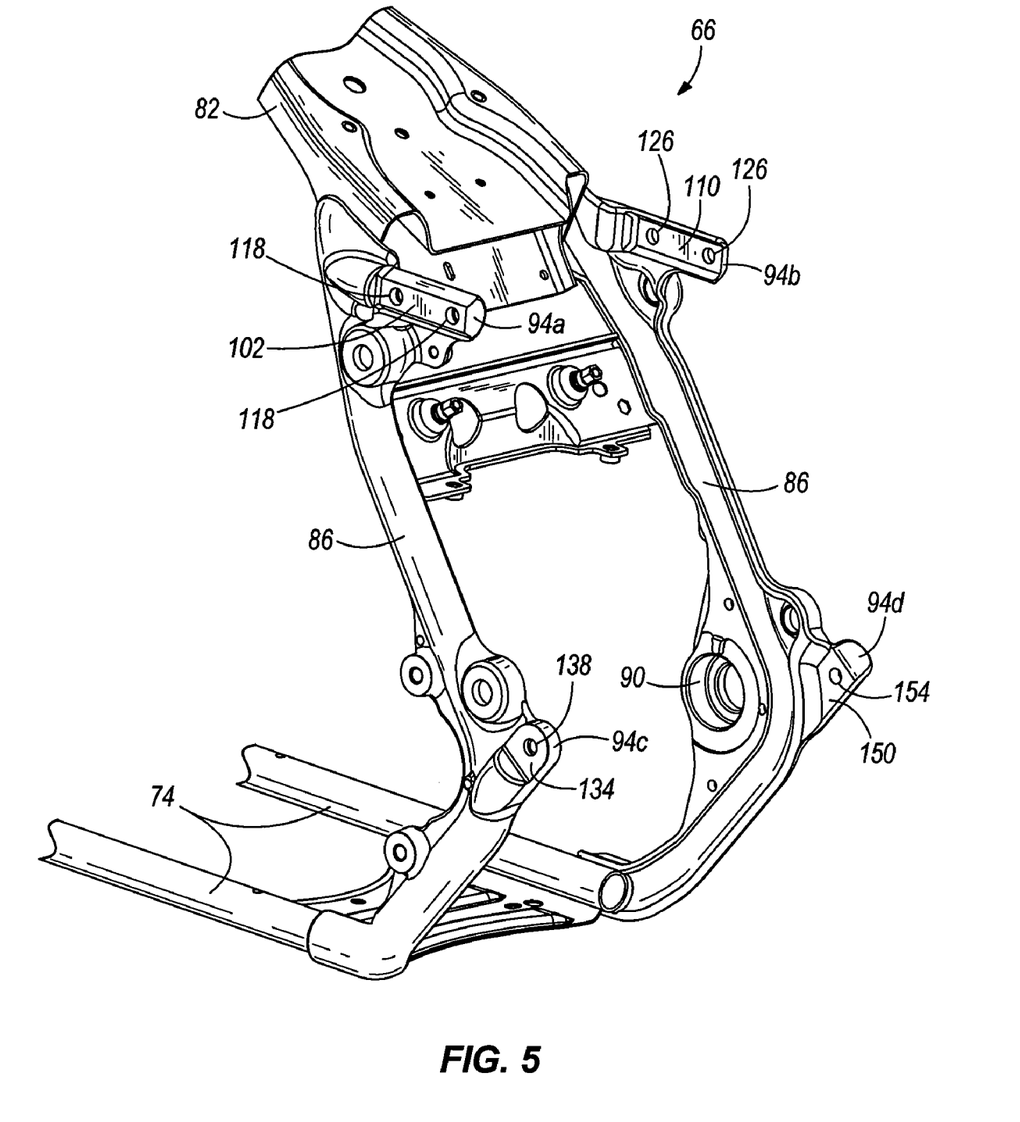
FIG. 5 is a rear perspective view of a portion of the main frame assembly.
Figure 6:
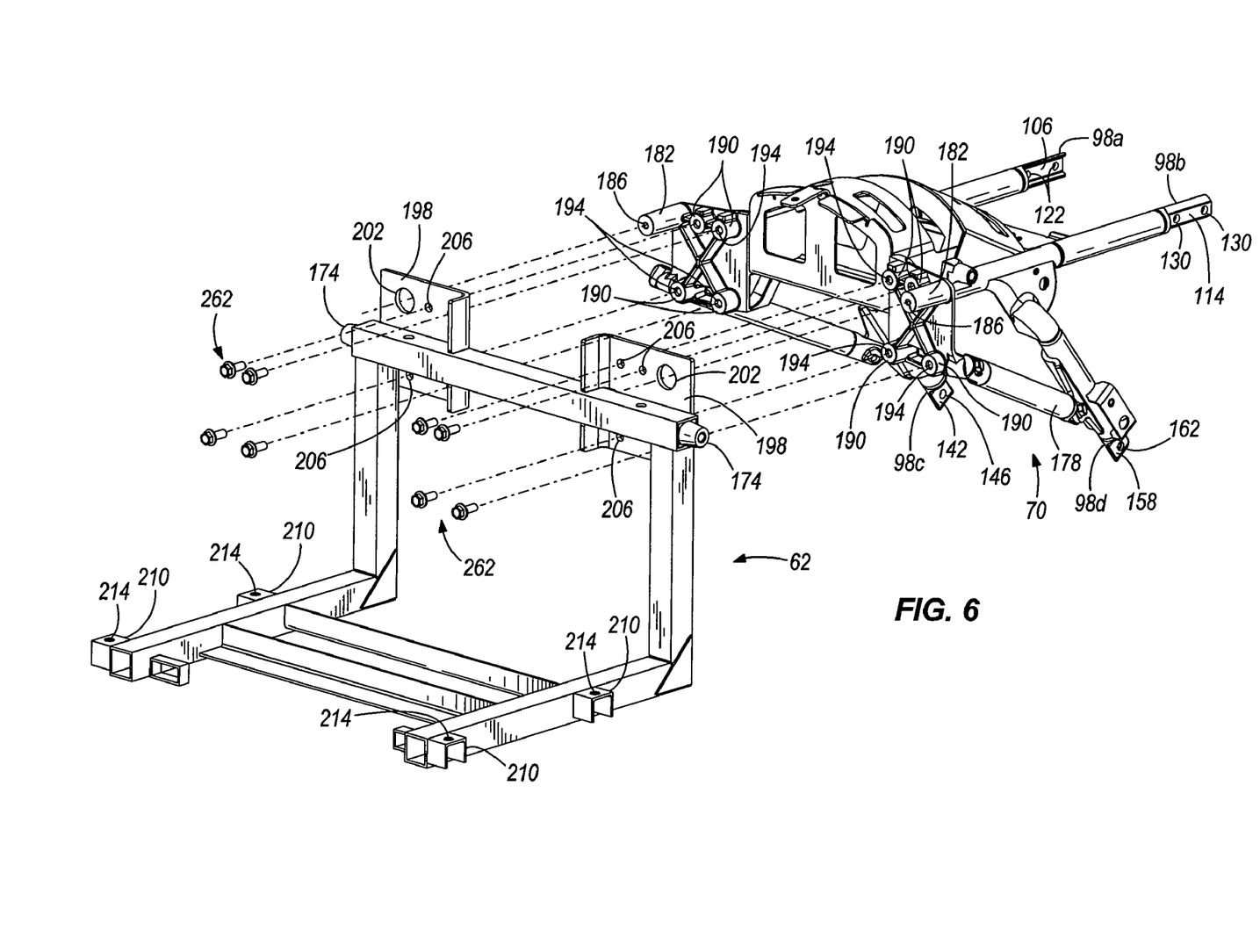
FIG. 6 is an exploded, rear perspective view of a portion of the main frame assembly and the rear frame of the portion of the three-wheeled vehicle of FIG. 2.

With reference to FIGS. 4-6, the main frame 66 includes a plurality of mounts 94a-94d and the tail frame 70 includes a plurality of mounts 98a-98d that engage the respective mounts 94a-94d of the main frame 66. As shown in FIGS. 4 and 5, two of the mounts 94a, 94b on the main frame 66 extend in a direction substantially parallel with the longitudinal frame members 74, while the remaining mounts 94c, 94d on the main frame 66, respectively, extend upwardly from the rear frame members 86 at an oblique angle relative to the longitudinal frame members 74. Alternatively, the mounts 94a-94d may be oriented on the main frame 66 in any of a number of different ways to connect to the tail frame 70.

With reference to FIGS. 4-6, the mount 94a on the main frame 66 includes a mounting portion 102, configured as a projection, and the corresponding mount 98a on the tail frame 70 includes a coupling portion 106, configured as a recess, into which the mounting portion 102 is at least partially received. Further, the mount 94b on the main frame 66 includes a mounting portion 110, configured as a recess, and the corresponding mount 98b on the tail frame 70 includes a coupling portion 114, configured as a projection, into which the mounting portion 110 is at least partially received. Alternatively, the locations of the mounting portions 102, 110 may be reversed, and the locations of the coupling portions 106, 114 may be reversed to correspond with the reversed mounting portions 102, 110. Also, the main frame 66 may alternatively include only a single mounting portion 102 or 110 or more than two mounting portions 102, 110. Likewise, the tail frame 70 may alternatively include only a single coupling portion 106 or 114 or more than two coupling portions 106, 114.

With reference to FIGS. 4 and 5, the mounting portion 102 includes dual threaded apertures 118 extending through the mount 94a, while the coupling portion 106 includes dual non-threaded apertures 122 extending through the mount 98a. However, the mounting portion 110 includes dual non-threaded apertures 126 extending through the mount 94b, and the coupling portion 114 includes dual threaded apertures 130 extending through the mount 98b.

With continued reference to FIGS. 4 and 5, the mount 94c includes a substantially planar mounting face or surface 134 and a threaded aperture 138 extending through the mount 94c, while the mount 98c includes a substantially planar coupling face or surface 142 and a non-threaded aperture 146 extending through the mount 98c. The mount 94d includes a substantially planar mounting face or surface 150 and a non-threaded aperture 154 extending through the mount 94d. The mount 98d includes a substantially planar coupling face or surface 162 and a threaded aperture 162 extending through the mount 98d. With reference to FIG. 4, each of the mounts 98a-98d is coupled to a corresponding tube of the tail frame 70 (e.g., by welding, using a press-fit, etc.). Alternatively, each of the mounts 98a-98d may be formed integrally as a single piece with the corresponding tubes of the tail frame 70.

With reference to FIGS. 4 and 5, the mounting portion 102 of the mount 94a and mounting surface 134 of the mount 94c are outboard-facing with respect to a longitudinal axis 166 of the frame 18, while the coupling portion 106 of the mount 98a and coupling surface 142 of the mount 98c are inboard-facing with respect to the longitudinal axis 166. However, the mounting portion 110 of the mount 94b and the mounting surface 150 of the mount 94d are inboard-facing with respect to the longitudinal axis 166, while the coupling portion 114 of the mount 98b and the coupling surface 158 of the mount 98d are outboard-facing with respect to the longitudinal axis 166. As a result, the tail frame 70 may be assembled to the main frame 66 by bringing into engagement the coupling portions 106, 114 and the respective mounting portions 102, 110 in a direction substantially transverse to the longitudinal axis 166 (see FIG. 4). Likewise, the tail frame 70 may be assembled to the main frame 66 by bringing into engagement the coupling surfaces 142, 158 and the respective mounting surfaces 134, 150 in a direction substantially transverse to the longitudinal axis 166. In this manner, the mounts 94a-94d are brought into engagement substantially simultaneously with the respective mounts 98a-98d in anticipation of fastening the tail frame 70 to the main frame 66.

With continued reference to FIG. 4, fasteners 170 (e.g., a threaded bolt and washer) are inserted through the apertures 122 in the mount 98a, and then inserted into the corresponding aligned threaded apertures 118 in the mount 94a. The fasteners 170 may be hand-tightened, causing the coupling portion 106 to engage or wedge against the mating mounting portion 102. In a similar manner, fasteners 170 are inserted through the apertures 126 in the mount 94b, and then inserted into the corresponding aligned threaded apertures 130 in the mount 98b. The fasteners 170 may be hand-tightened, causing the coupling portion 114 to engage or wedge against the mating mounting portion 110. The fasteners 170 may be further tightened using conventional hand tools (e.g., wrenches or ratcheting sockets), causing the coupling portions 106, 114 to wedge against and lock to the respective mounting portions 102, 110. Additional fasteners 170 are inserted through the apertures 146, 154 in the respective mounts 98c, 94d, and threaded into the threaded apertures 138, 162 in the respective mounts 94c, 98d.

Figure 7:
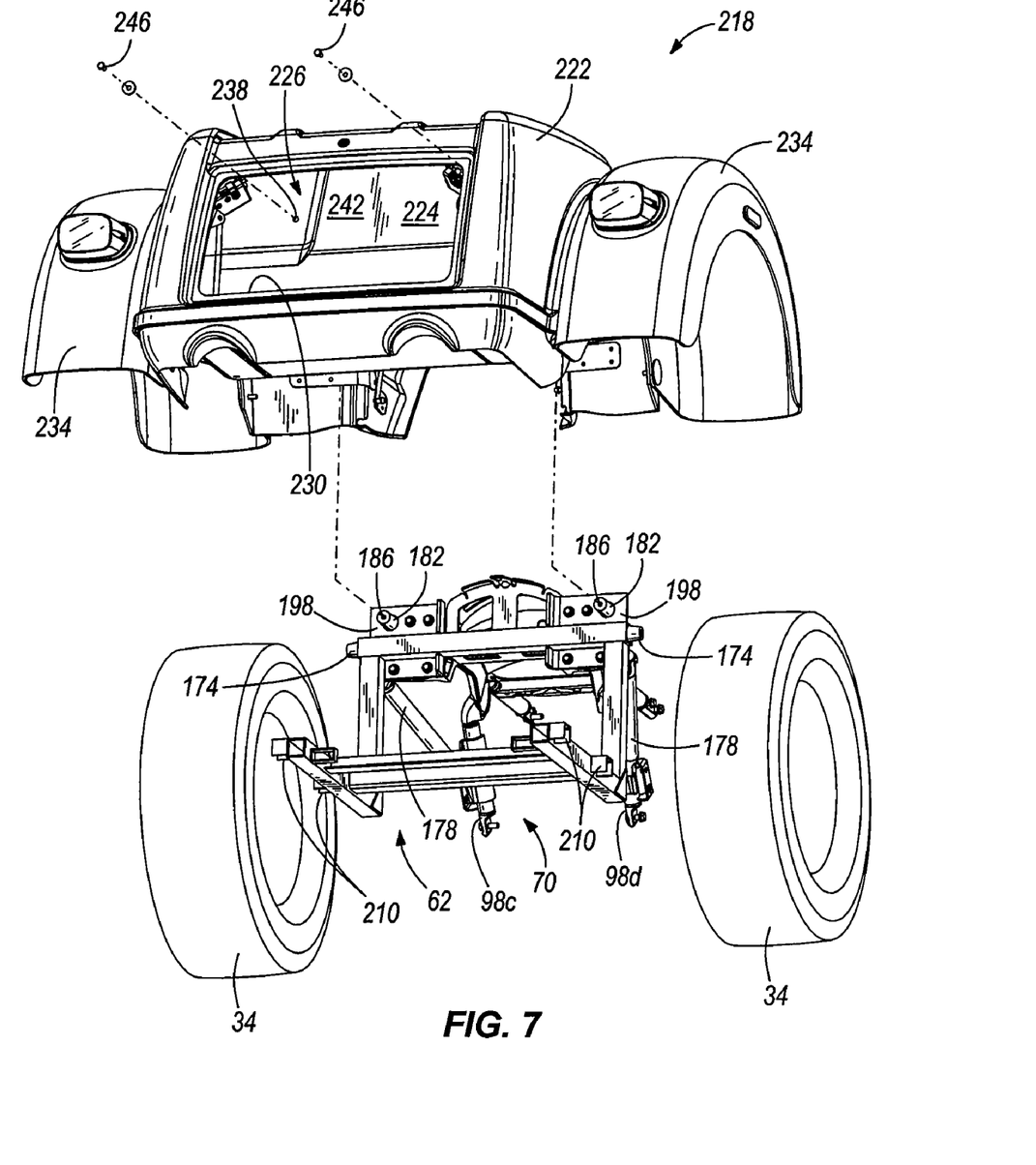
FIG. 7 is an exploded, rear perspective view of a portion of the three-wheeled vehicle of FIG. 2.

With reference to FIGS. 4, 6, and 7, the rear frame 62 includes a boss 174 on each side of the rear frame 62 to which one end of a suspension component (e.g., a strut; not shown) is mounted. The other end of the suspension component is mounted to the rear axle assembly. As such, the suspension loading or the forces exerted by the strut initially pass through the rear frame 62 and the tail frame 70 before being transferred to or reaching the main frame 66. Additional braces 178 are also utilized to interconnect the front portion of the tail frame 70 and the rear portion of the tail frame 70.

With reference to FIG. 6, the tail frame 70 includes dual rearwardly-extending bosses 182, each having a threaded aperture 186 therein, positioned on opposite sides of the longitudinal axis 166. Additional bosses 190, each having a threaded aperture 194 therein, are positioned in close proximity to the respective bosses 182. With continued reference to FIG. 6, the rear frame 62 includes respective mounting plates 198, each having an aperture 202 aligned with a boss 182 on the tail frame 70 and sized to least partially receive the boss 182 on the tail frame 70. The bosses 182 extend farther in the rearward direction of the vehicle 10 (i.e., from the front wheel 30 to the rear wheels 34) than the bosses 190. Each of the plates 198 also includes a plurality of apertures 206 aligned with the respective threaded apertures 194 in the bosses 190. In addition, the rear frame 62 includes a plurality of perches or mounts 210, each having a non-threaded aperture 214 therein, the purpose of which will be described in greater detail below.

With reference to FIGS. 1-4, the three-wheeled vehicle 10 includes a trunk or storage compartment 218 coupled to and supported by the multi-piece frame 18 of the vehicle 10. With reference to FIG. 3, the storage compartment 218 includes a body 222 having an interior surface 224 defining a cavity 226, in which accessories or other items (e.g., clothing, spare parts, removable parts, etc.) may be stored. The storage compartment 218 also includes a lid (not shown) that is selectively movable to open and close an opening 230 in the body 222 to selectively allow and prevent access to the cavity 226. Respective fenders 234 are coupled to either side of the body 222 to at least partially cover the rear wheels 34 (see FIG. 3). In the illustrated construction of the three-wheeled vehicle 10, the fenders 234 are separate and distinct components from the body 222 of the storage compartment 218, and are secured to the body 222 by fasteners (e.g., bolts, rivets, etc.). Alternatively, the fenders 234 may be integrally formed as a single piece with the body 222 of the storage compartment 218.

Figure 8:
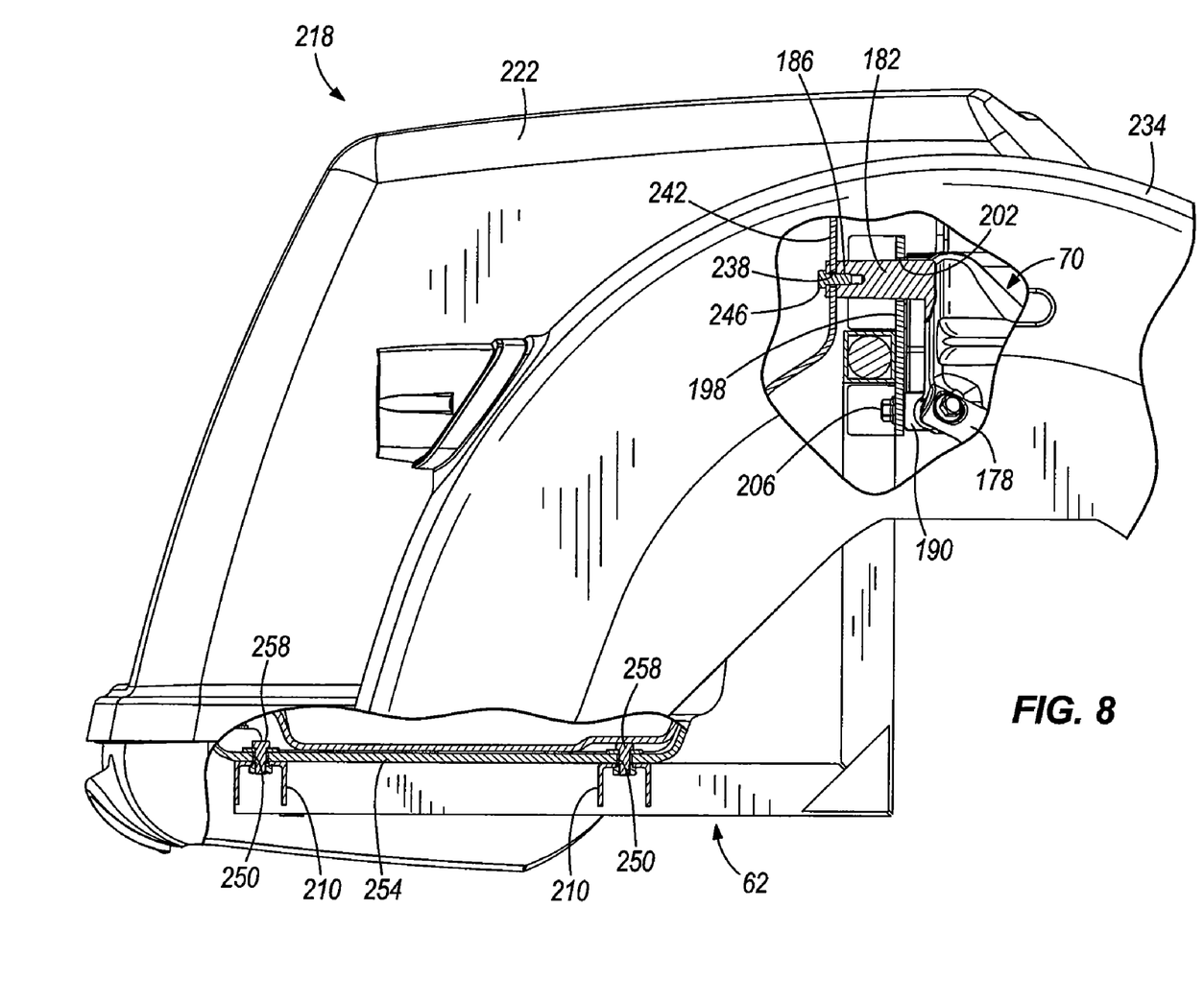
FIG. 8 is a side, partial cutaway view of the assembled intermediate frame, rear frame, and trunk body of the three-wheeled vehicle of FIG. 2.

In the illustrated construction of the three-wheeled vehicle 10 of FIG. 8, the body 222 includes a plurality of apertures 238 formed in a first mounting portion or side wall 242 of the body 222, through which respective fasteners 246 (e.g., bolts) are inserted to secure the side wall 242 to the respective bosses 182 extending from the tail frame 70. Alternatively, at least a portion of the fasteners 246 may be integrally formed as a single piece with the side wall 242 (e.g., the bolt). In addition, the body 222 includes a plurality of apertures 250 formed in a second mounting portion or lower wall 254 of the body 222, through which respective fasteners 258 (e.g., bolts) are inserted to secure the lower wall 254 to the mounts 210 on the rear frame 62. Likewise, in an alternative construction of the vehicle 10, at least a portion of the fasteners 258 may be integrally formed as a single piece with the lower wall 254 (e.g., the bolt).

With reference to FIG. 6, during manufacture of the three-wheeled vehicle 10, the rear frame 62 is initially aligned with the tail frame 70 using the respective bosses 182 on either side of the longitudinal axis 166 as guides. Particularly, the rear frame 62 is aligned with the tail frame 70 by at least partially positioning the bosses 182 within the respective apertures 202 in the mounting plates 198 of the rear frame 62. This, in turn, provides alignment of the apertures 206 in the mounting plates 198 with the threaded apertures 194 in the respective bosses 190 on the tail frame 70. Fasteners 262 (e.g., bolts) are inserted through the apertures 206 in the mounting plate 198 and threaded into the threaded apertures 194 of the bosses 190 to secure the mounting plates 198 of the rear frame 62 against the respective bosses 190, thereby securing the rear frame 62 directly to the tail frame 70.

With reference to FIG. 7, after the rear frame 62 is secured to the tail frame 70, the body 222 of the storage compartment 218 may be directly coupled to the tail frame 70 by fastening the side wall 242 of the body 222 to the respective bosses 182 on the tail frame 70 (see FIG. 8). In this manner, the body 222 of the storage compartment 218 is aligned with the tail frame 70, thereby reducing the potential for misalignment between the storage compartment 218 and other body panels mounted to the main frame assembly 58 due to tolerance stack-up between the main frame assembly 58 and the rear frame 62. With continued reference to FIG. 8, after the side wall 242 of the body 222 is secured to the respective bosses 182 on the tail frame 70, the body 222 of the storage compartment 218 may be directly coupled to the rear frame 62 by fastening the lower wall 254 of the body 222 to the respective mounts 210 on the rear frame 62. Alternatively, the lower wall 254 may be fastened to the respective mounts 210 before the side wall 242 is fastened to the respective bosses 182 extending from the tail frame 70.

Various features of the invention are set forth in the following claims.

What is claimed is:

1. A three-wheeled vehicle comprising:
    a main frame assembly including a steering head disposed on a front portion of the main frame assembly;
    a front fork assembly pivotably coupled to the steering head;
    a front wheel rotatably supported by the front fork assembly;
    a rear frame coupled to a rear portion of the main frame assembly;
    a rear axle assembly coupled to at least one of the main frame assembly and the rear frame;
    a pair of rear wheels rotatably supported by the rear axle assembly;
    an engine-transmission assembly supported by the main frame assembly and positioned between the front wheel and the pair of rear wheels; and
    a body including
        a first mounting portion directly mounted to the main frame assembly, and
        a second mounting portion directly mounted to the rear frame;
    wherein the main frame assembly includes a first boss having a threaded aperture therein, wherein the first mounting portion is secured to the first boss by a fastener at least partially received within the threaded aperture in the first boss;
    wherein the main frame assembly includes a second boss abutted by a portion of the rear frame and having a threaded aperture therein, wherein the rear frame is secured to the second boss by a fastener at least partially received within the threaded aperture in the second boss, and wherein the rear frame includes an aperture through which the first boss of the main frame assembly is at least partially received.

2. The three-wheeled vehicle of claim 1, wherein the first boss extends in a direction away from the steering head farther than the second boss.

3. The three-wheeled vehicle of claim 1, wherein the rear frame includes a plate in which the aperture is positioned.

4. The three-wheeled vehicle of claim 1, wherein the main frame assembly includes a third boss, wherein the rear frame includes a second aperture through which the third boss of the main frame assembly is at least partially received, and wherein the first and third bosses are located on the main frame assembly on opposite sides of a longitudinal axis through the main frame assembly.

5. The three-wheeled vehicle of claim 4, wherein the first and third bosses extend in a direction substantially parallel with the longitudinal axis of the main frame assembly.

6. The three-wheeled vehicle of claim 1, wherein the main frame assembly includes
    a first frame having the steering head and a first mount; and a second frame including a second mount coupled to the first mount with a threaded fastener, wherein the rear frame is directly coupled to the second frame.

7. The three-wheeled vehicle of claim 6, wherein the first boss is positioned on the second frame.

8. A three-wheeled vehicle comprising:
a main frame assembly including a steering head disposed on a front portion of the main frame assembly;
a front fork assembly pivotably coupled to the steering head;
a front wheel rotatably supported by the front fork assembly;
a rear frame coupled to a rear portion of the main frame assembly;
a rear axle assembly coupled to at least one of the main frame assembly and the rear frame;
a pair of rear wheels rotatably supported by the rear axle assembly;
an engine-transmission assembly supported by the main frame assembly and positioned between the front wheel and the pair of rear wheels; and
a body including
a first mounting portion directly mounted to the main frame assembly, and
a second mounting portion directly mounted to the rear frame;
wherein the main frame assembly includes a boss, wherein the first mounting portion is secured to the boss on the main frame assembly, and wherein the rear frame includes an aperture through which the boss of the main frame assembly is at least partially received.

9. The three-wheeled vehicle of claim 8, wherein the boss includes a threaded aperture therein, and wherein the first mounting portion is secured to the boss by a fastener at least partially received within the threaded aperture.

10. The three-wheeled vehicle of claim 9, wherein the main frame assembly includes a second boss abutted by a portion of the rear frame.

11. The three-wheeled vehicle of claim 10, wherein boss extends in a direction away from the steering head farther than the second boss.

12. The three-wheeled vehicle of claim 8, wherein the rear frame includes a plate in which the aperture is positioned.

13. The three-wheeled vehicle of claim 8, wherein the main frame assembly includes a second boss, wherein the rear frame includes a second aperture through which the second boss of the main frame assembly is at least partially received, and wherein the first and second bosses are located on the main frame assembly on opposite sides of a longitudinal axis through the main frame assembly.

14. The three-wheeled vehicle of claim 13, wherein the first and second bosses extend in a direction substantially parallel with the longitudinal axis of the main frame assembly.

15. The three-wheeled vehicle of claim 8, wherein the main frame assembly includes
a first frame having the steering head and a first mount; and
a second frame including a second mount coupled to the first mount with a threaded fastener, wherein the rear frame is directly coupled to the second frame.

16. The three-wheeled vehicle of claim 15, wherein the boss is positioned on the second frame.

17. The three-wheel vehicle of claim 8, wherein the body includes a pair of fenders covering the respective rear wheels.

18. The three-wheeled vehicle of claim 8, wherein the body includes a trunk cavity disposed between the rear wheels.

19. A three-wheeled vehicle comprising:
a main frame assembly including a steering head disposed on a front portion of the main frame assembly;
a front fork assembly pivotably coupled to the steering head;
a front wheel rotatably supported by the front fork assembly;
a rear frame coupled to a rear portion of the main frame assembly;
a rear axle assembly coupled to at least one of the main frame assembly and the rear frame;
a pair of rear wheels rotatably supported by the rear axle assembly;
an engine-transmission assembly supported by the main frame assembly and positioned between the front wheel and the pair of rear wheels; and
a body including
a first mounting portion directly mounted to the main frame assembly, and
a second mounting portion directly mounted to the rear frame;
wherein the main frame assembly includes a boss having a first threaded aperture therein, wherein the first mounting portion is secured to the boss by a fastener at least partially received within the first threaded aperture;
wherein the main frame assembly includes a second threaded aperture, wherein the rear frame is secured to the main frame assembly by a fastener at least partially received within the second threaded aperture, and wherein the rear frame includes an aperture through which the boss of the main frame assembly is at least partially received.

* * * * *